US012707021B2

(12) United States Patent
Sun et al.

(10) Patent No.: US 12,707,021 B2
(45) **Date of Patent: *Aug. 11, 2026**

(54) ELECTRONIC TUNABLE CABLE SIMULATOR

(71) Applicant: ARRIS Enterprises LLC, Horsham, PA (US)

(72) Inventors: Zhijian Sun, Avon, CT (US); Brent D. Arnold, Doylestown, PA (US); Eric J. Cormier, Bristol, CT (US); Marcel F.C. Schemmann, Maria Hoop (NL)

(73) Assignee: ARRIS Enterprises LLC, Horsham, PA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/607,175

(22) Filed: Mar. 15, 2024

(65) Prior Publication Data

US 2024/0223724 A1 Jul. 4, 2024

Related U.S. Application Data

(63) Continuation of application No. 18/208,674, filed on Jun. 12, 2023, now Pat. No. 11,968,474.

(60) Provisional application No. 63/391,964, filed on Jul. 25, 2022.

(51) Int. Cl.

*H04N 7/10* (2006.01)
*H04B 3/14* (2006.01)
*H04N 21/61* (2011.01)

(52) U.S. Cl.

CPC ............ *H04N 7/102* (2013.01); *H04B 3/141* (2013.01); *H04N 21/6118* (2013.01); *H04N 21/6168* (2013.01)

(58) Field of Classification Search

CPC .......... H04N 21/6118; H04N 21/6168; H04N 7/102; H04B 3/141

See application file for complete search history.

(56) References Cited

U.S. PATENT DOCUMENTS

| | | | | |
|---|---|---|---|---|
| 3,771,071 | A | 11/1973 | Delfrate | |
| 5,214,505 | A | 5/1993 | Rabowsky et al. | |
| 6,549,087 | B1 | 4/2003 | Hoang et al. | |
| 7,177,143 | B1 | 2/2007 | Gomez | |
| 7,683,732 | B1 * | 3/2010 | Blumenkranz | H04B 3/14 333/28 R |
| 2002/0190811 | A1 | 12/2002 | Sperber | |
| 2009/0041106 | A1 * | 2/2009 | Perez | H03F 3/62 375/229 |
| 2016/0182261 | A1 * | 6/2016 | Al-Banna | H04L 25/03343 375/229 |
| 2018/0323876 | A1 | 11/2018 | Ping et al. | |

(Continued)

FOREIGN PATENT DOCUMENTS

| | | | | |
|---|---|---|---|---|
| EP | 1157478 | A2 | 11/2001 | |
| EP | 1157478 | B1 * | 12/2005 | H04B 3/145 |

OTHER PUBLICATIONS

International Search Report and Written Opinion RE: Application No. PCT/US23/27364, dated Sep. 8, 2023.

*Primary Examiner* — Gigi L Dubasky

(74) *Attorney, Agent, or Firm* — Chernoff, Vilhauer, McClung & Stenzel, LLP

(57) ABSTRACT

A design for a Tunable Cable Simulator with a minimum number of components and low insertion loss.

18 Claims, 17 Drawing Sheets

(56) References Cited

U.S. PATENT DOCUMENTS

| | | | | |
|---|---|---|---|---|
| 2019/0280886 | A1 | 9/2019 | Holobinko et al. | |
| 2023/0370110 | A1* | 11/2023 | Qin | H04B 1/48 |

* cited by examiner

| FREQUENCY | TAP 1 | TAP 2 | TAP 3 | TAP 4 |
|---|---|---|---|---|
| | NO EQ (dBmV) | NO EQ (dBmV) | NO EQ (dBmV) | NO EQ (dBmV) |
| 258 | 2.43 | 0.03 | 0.32 | 3.34 |
| 1002 | 11.32 | 6.80 | 4.77 | 5.74 |

FIG. 5

| | Loss Per Foot | | | |
|---|---|---|---|---|
| Common Cable Type | 900 MHz | 2,000 MHz | 2,500 MHz | 5,000 MHz |
| RG-174 | 0.32 dB | 0.49 dB | 0.50 dB | Not Recommended |
| RG-58 | 0.14 dB | 0.21 dB | 0.24 dB | 0.43 dB |
| RF-195 | 0.10 dB | 0.15 dB | 0.17 dB | 0.25 dB |
| LMR-240 | 0.07 dB | 0.10 dB | 0.14 dB | 0.17 dB |
| LMR-400 | 0.04 dB | 0.06 dB | 0.07 dB | 0.12 dB |

| | Tunable Cable Simulator(1218-108 MHz) | | | | | | Pin Diodes/Variable Cap | |
|---|---|---|---|---|---|---|---|---|
| | 0dB | 2dB | 7dB | 10.5 | 16dB | 18.5 | p/n 865 | Current Range 867 |
| R127 | 2.4 | 17.5 | 142 860b | 343 | 2000 | 4 | MADP-007167 | 7mA-100µA |
| R125 | 999 | 73.5 | 10 860d | 1.28 | 5.3 | 1.6 | MADP-007167 | 7mA-100µA |
| R126 | 1900 | 2000 | 227 860a | 77 | 1 | 2.1 | MADP-007167 | |
| C80 | 4pF | 1.5pF | 4pF 860c | 5.7pF | 17.5pF | 28pF | | |

*FIG. 8B*

- Response Flatness Is Within 0.6 dB Pk-Pk Over 0-16 dB Tuning Range, And 0.8 dB Pk-Pk At 18.5 dB.
- RL Is>16 dB For The Tuning Range Of 0-18.5 dB

ELECTRONIC TUNABLE CABLE SIMULATOR

This application is a continuation of U.S. patent application Ser. No. 18/208,674, filed Jun. 12, 2023, which claims the benefit of U.S. Provisional Patent Application Ser. No. 63/391,964 filed Jul. 22, 2023.

TECHNICAL FIELD

This application relates to a tunable cable simulator with a minimal number of components and low insertion loss.

BACKGROUND

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers, and test access points (TAPs)). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services.

When constructing a cable network, non-equal loss in signal strength through the cable network occurs. This loss in signal strength varies with frequency of the signal. In particular, the coaxial cables used in hybrid fiber networks have a greater signal attenuation at higher frequencies with respect to lower frequencies.

To combat this loss, one more amplifier can provide a boosted signal for a section of the cable network. Along the cable network section, a series of TAPs, or directional coupler, of the coaxial cable may be provided, with each tap interconnecting one or more respective coaxial cables to one or more destinations, for example, home. A tap is used to connect "drop cables" to a "distribution cable" in the cable network.

Current tools available in the art for tunable attenuators or equalizers utilize the above-mentioned types of products and are all time and resource intensive. As a result, an RF amplifier that requires a cable simulator plug-in must dedicate a plug-in location to support this functionality, which cannot be locally or remotely controlled. Thus, there has been a need for an electronically controlled, tunable cable simulator.

This application discloses a design and method for a remotely tunable cable simulator with a minimum number of components and low insertion loss

BRIEF DESCRIPTION OF THE DRAWINGS

FIG. 6 illustrates a chart of varying degrees of cable loss for example types of cable.

FIG. 8B is an example associated lookup table.

Like reference numbers and designations in the various drawings indicate like elements.

DETAILED DESCRIPTION

In some implementations of this application, systems and methods can operate as a development tool for users to design and build amplifiers in order to meet DOCSIS requirements. The methods disclosed herein address the need for users to place amplifiers along a length of cable to bump up a signal strength when line loss occurs and methods for programming the same.

Data Over Cable Service Interface Specification, or DOCSIS, is an international telecommunications standard that allows for the addition of high-bandwidth data transfer to an existing coaxial cable TV system. It is important for Internet users and Internet providers, because it allows Internet speeds to increase without having to completely replace coaxial cable networks. In an ideal world, everyone would have Fiber to the Home service; however, in reality, that is cost prohibitive on a grand scale.

On a practical level, DOCSIS matters for consumers because the DOCSIS standard is needed when purchasing a modem for cable Internet connection. Depending on the quality of a user's connection, the answer is not necessarily just to implement the newest one. DOCSIS continues to evolve to accommodate new services, technologies, and demands from users all over the world. The embodiments disclosed herein will facilitate the development of fully, electronically controlled RF amplifiers to support present and future DOCSIS requirements.

Cables are used in many high-frequency board designs and can become a critical element in the signal path. This is especially true for signals that exceed 500 MHz. If not modeled as part of that system, cables can lead to unexpected system performance degradation and to costly time delays in debugging and corrections. Even with this understood, cables are notoriously difficult to model correctly. Using a simple transmission line model may not effectively model this element because it is difficult to model a cable both in the frequency and the time domains.

To understand the effects of cables at all frequencies, the cable needs to be modeled. Based on that model, more intelligent decisions can be made about the type of cable to be used. In addition, the parameters of interest that are being degraded in the signal path can then be understood.

When developers are developing a RF amplifier in designing a cable system, the embodiments disclosed herein allow for a user to avoid having to have large amounts of actual physical cable to simulate losses in the cable. They can do so using a simulator from a remote location.

Figure 1:
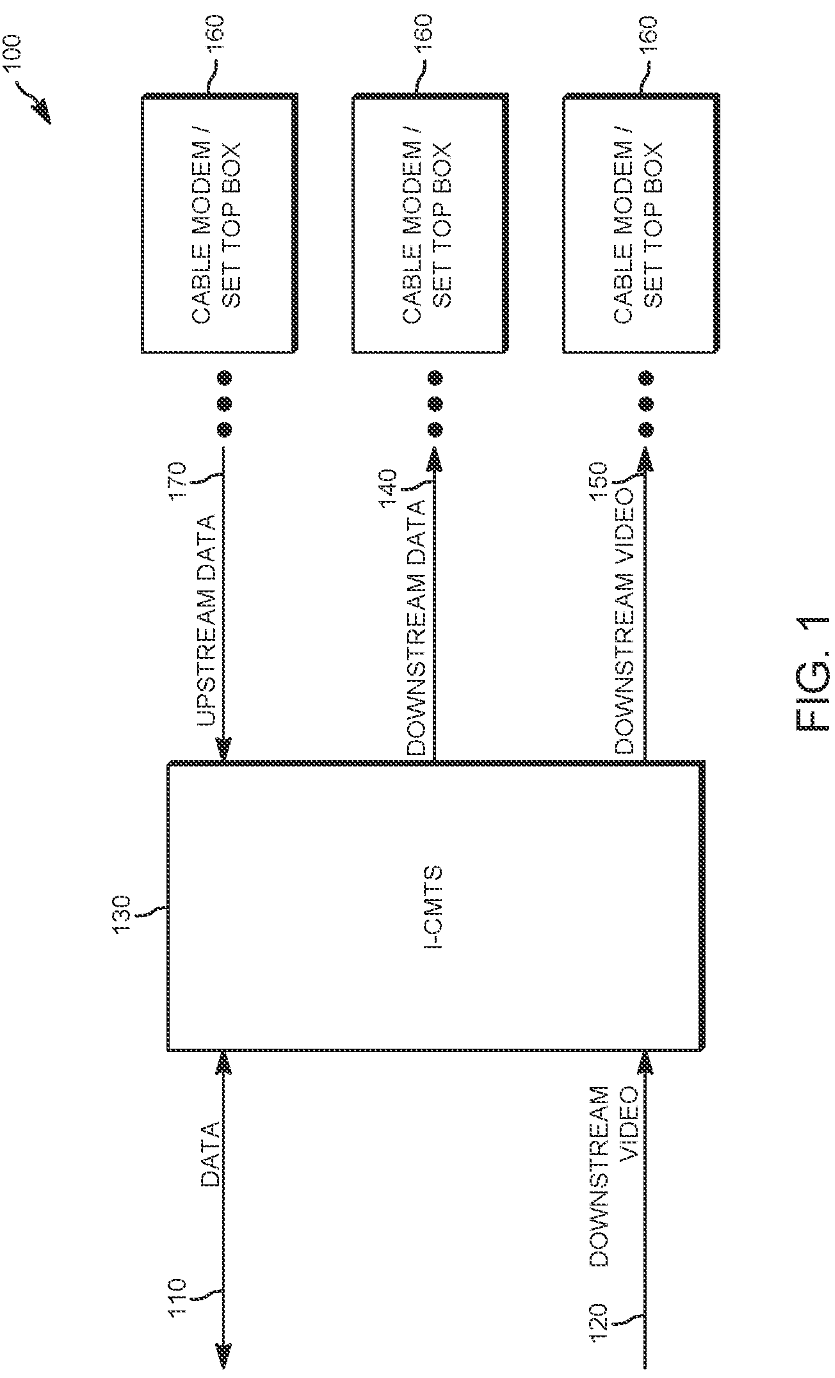
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
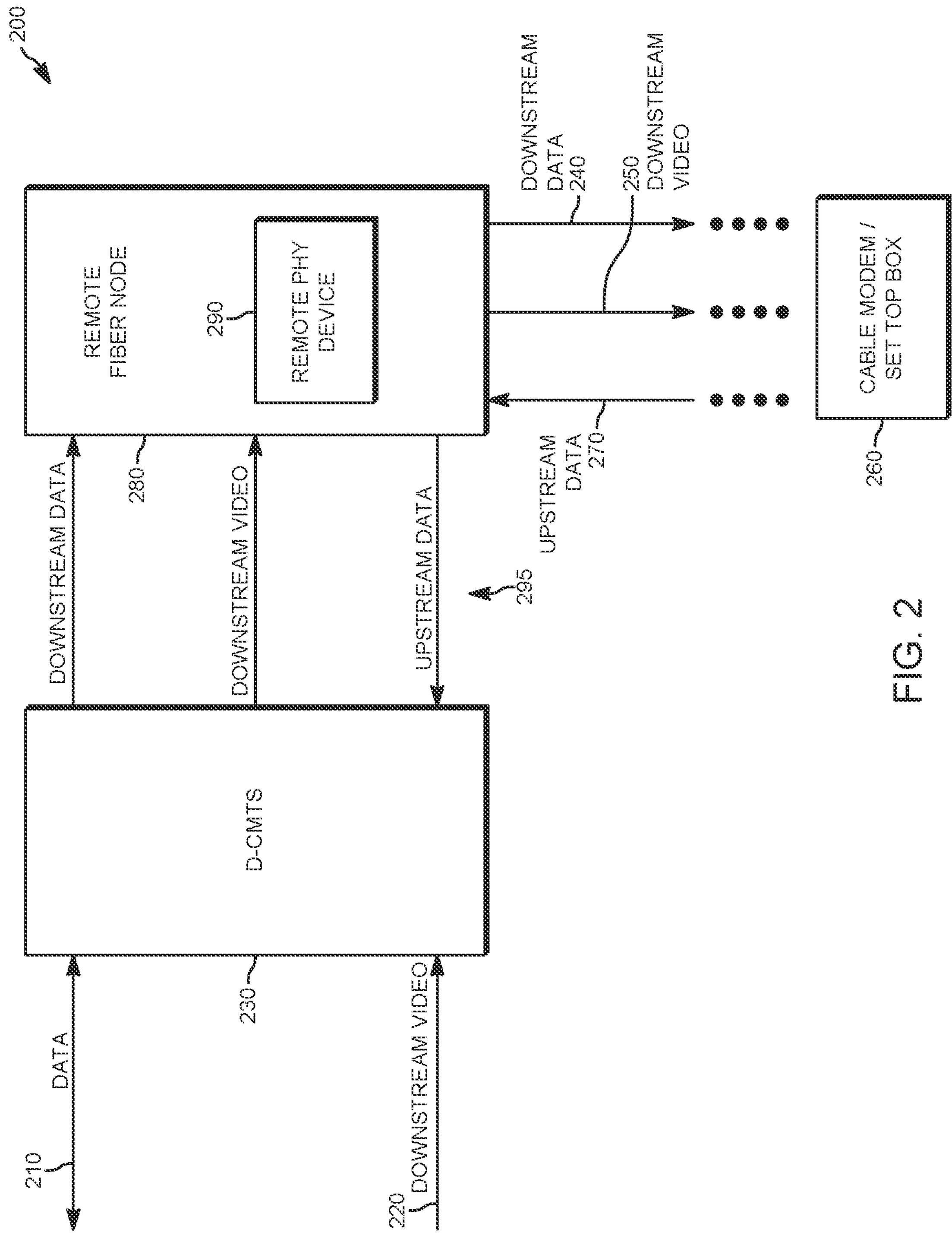
FIG. 2 illustrates a distributed Cable Modem Termination System.

Referring to FIG. 2, as a result of increasing bandwidth demands, limited facility space for integrated CMTSs, and power consumption considerations, it may be desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably includes a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with pseudowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out-of-band signals received from the D-CMTS 230 to analog for transmission over RF or analog optics. By way of example, the remote PHY device 290 may convert upstream DOCSIS, and out-of-band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

As is evident from the preceding figures, as frequencies start to exceed 500 MHz, a cable starts to noticeably impact the bandwidth of the signal path and begins to degrade this path in many ways.

Cable nonideal dispersive effects can affect system performance. This loss is referred to as line loss, or cable loss. There are two main loss mechanisms with cables: skin-effect and dielectric losses. At high frequencies, the signal tends to propagate along the surface of the conductor. This is known as skin effect. Dielectrics, for example insulating materials, will have some energy loss when subjected to varying electric fields. Together they are referred to as total cable loss. Therefore, skin-effect losses dominate at lower frequencies and dielectric losses dominate at higher frequencies. Cable loss, or insertion loss, refers to the amount of power loss over a cable's length. For example, the longer a cable is, the more the power is lost.

When constructing a cable network, it is desirable to manage the non-equal loss in signal strength through the cable network that varies with frequency of the signal. As previously mentioned, and in particular, the coaxial cables used in hybrid fiber networks have a greater signal attenuation at higher frequencies with respect to lower frequencies.

Figure 3:
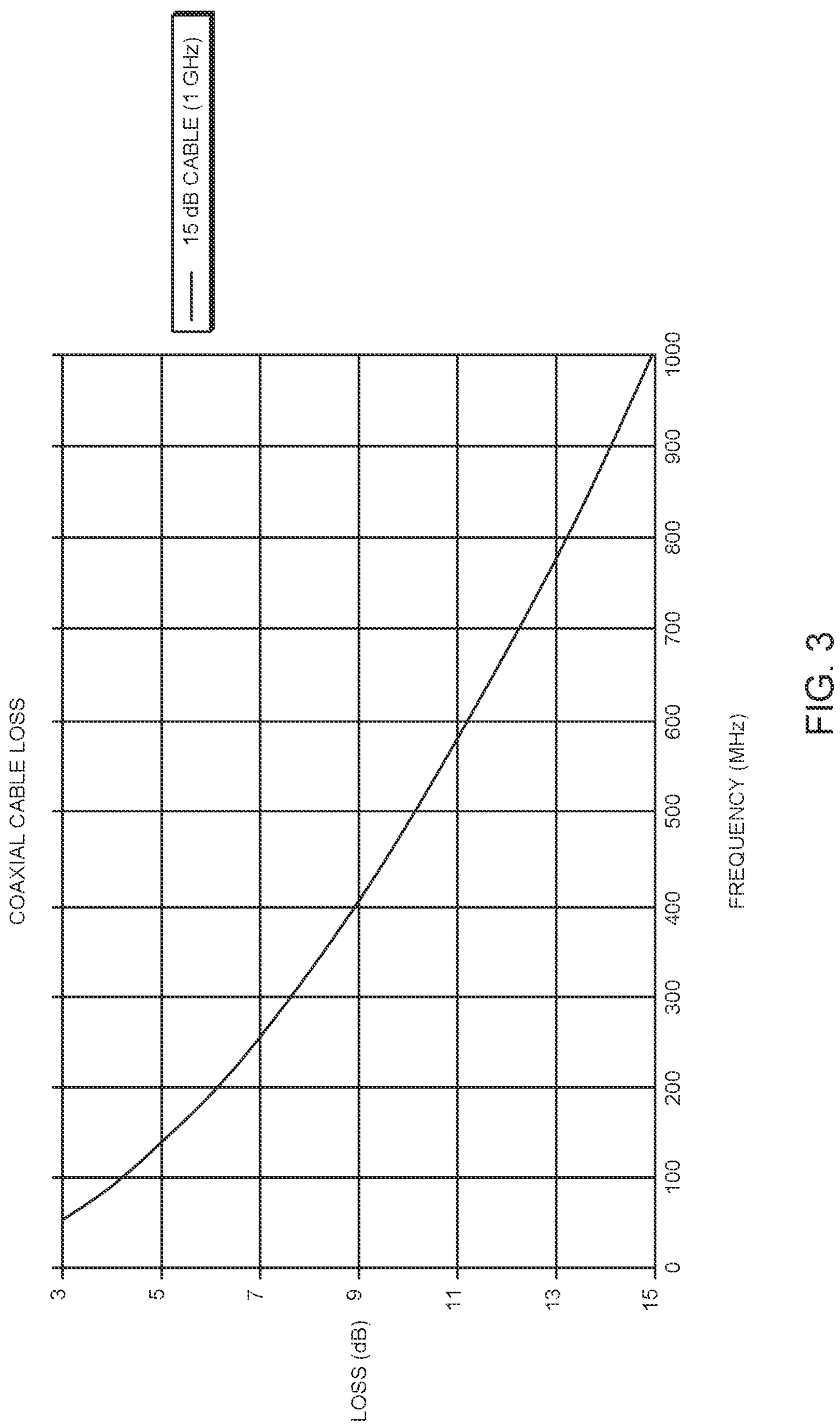
FIG. 3 illustrates a graph of coaxial cable loss.
Figure 4:
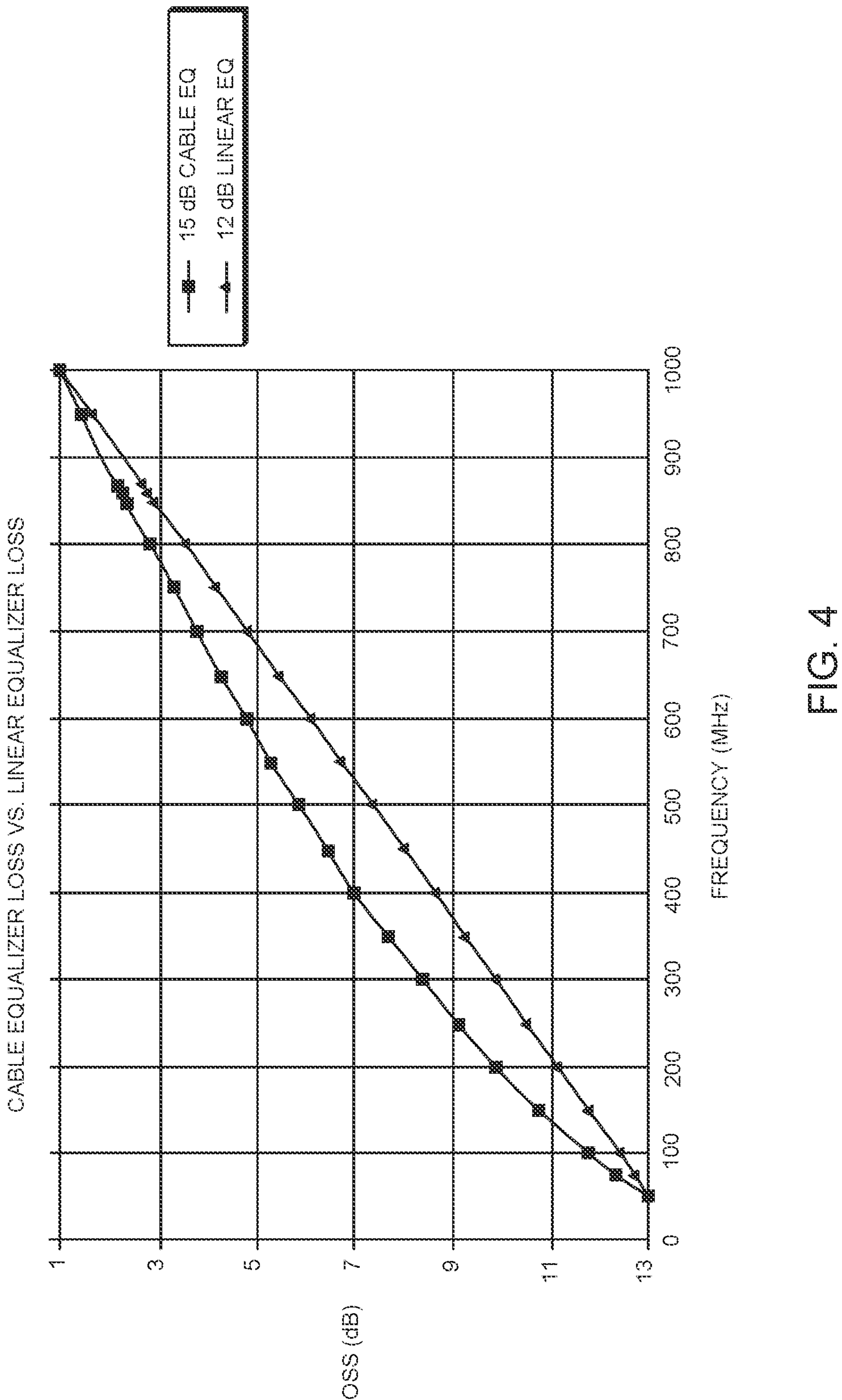
FIG. 4 illustrates a graph of cable equalizer loss versus linear equalizer loss.

Referring to FIG. 3, a plot of a coaxial cable loss versus frequency has a curved, down-tilted shape. To counteract the effect associated with the coaxial cable, cable equalizers are included in the cable network. Referring to FIG. 4, a plot of a cable equalizer loss versus frequency is illustrated. The dB value of the cable equalizer indicates an amount of signal conditioning that it is designed to apply for which is roughly equivalent to the difference in loss between its highest and lowest frequency of operation. Cable equalizers are often available as a plug-in component in a wide range of fixed dB values. Often, the cable equalization is accomplished at the input of the amplifier in the downstream direction, with additional equalization between amplifier gain stages. Often, the cable equalization is accomplished at the output of the amplifier in the upstream direction, with additional equalization between amplifier gain stages.

For the cable network, an amplifier provides a boosted signal for a section of the cable network. Along the cable network section, a series of TAPs of the coaxial cable may be provided, with each tap interconnecting one or more respective coaxial cables to one or more homes. A tap is used to connect "drop cables" to a "distribution cable" in the cable network.

Figure 5:
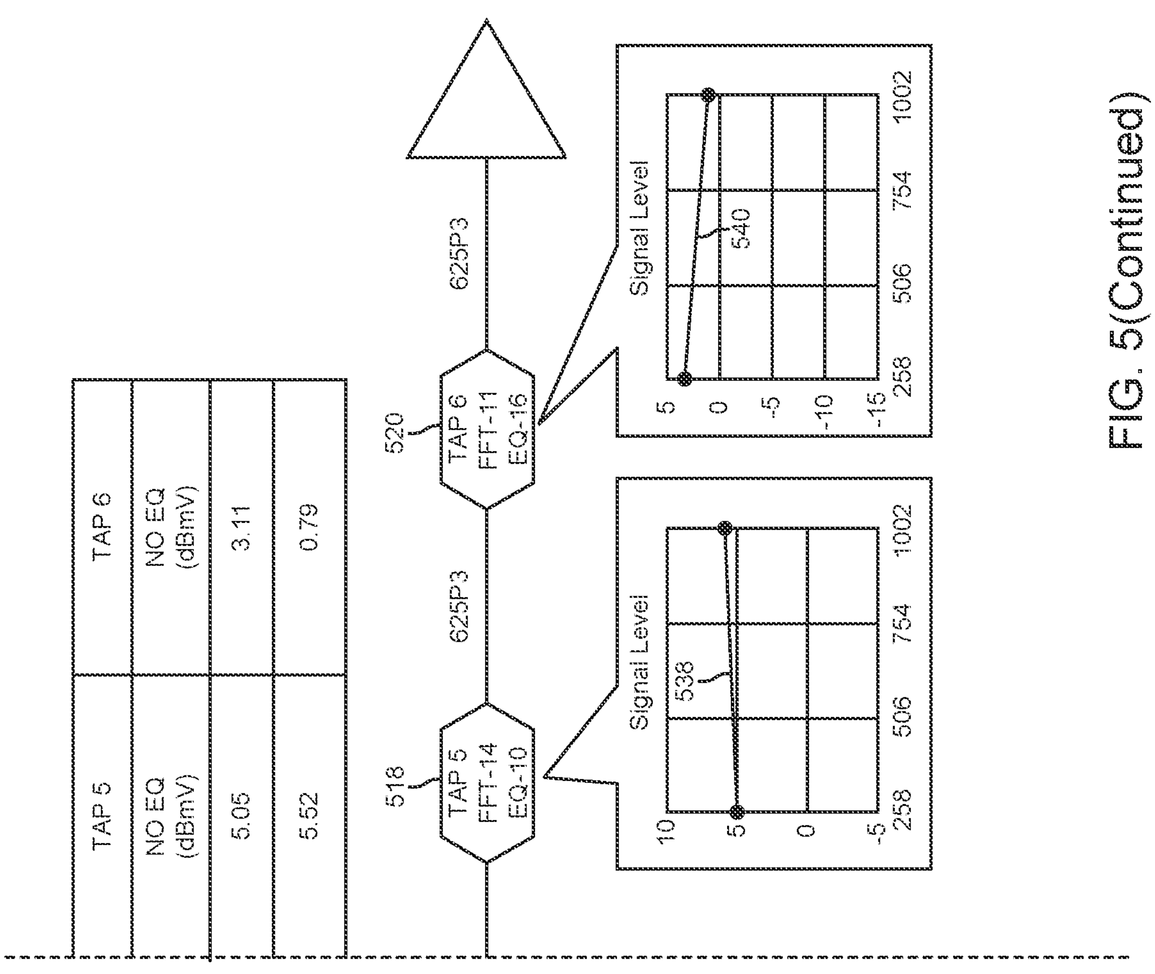
FIG. 5 is a chart showing typical dB loss per foot for some example cable sizes.

Referring now to FIG. 5, an example is shown which illustrates another measure, the tilt in the signal, through the cable network. The tilt provides a value or measurement that allows the signal on the high and low band channels to be viewed at the same time. When these levels are read on a tilt display it is commonly referred to as high/low. A normal tilt reading will show the high band channel at a higher level than the low band channel, with some exceptions. For example, in some systems the end of line (EOL) TAPs may have flat levels. Reverse tilt occurs when the high levels are lower than the low levels and optimally should not occur.

As shown in FIG. 5, the signal may originate from an amplifier 500 with a forward tilt. Without signal modification at a first tap 510 the signal 530 has attenuated its higher frequency signals more than its lower frequency signals. Additional TAPs are selected to compensate for coupled ports' levels based upon the combination of the cable spans between the TAPs 512, 514, 516, and 518 and the tap thru responses 532, 534, 536, 538. The cable simulator or equalizer that is selected at each tap is selected to compensate the cable spans between the TAPs, the tap thru responses, and the drop characteristics of the subscriber.

To understand the effects of cables at all frequencies, a cable system is modeled. Based on the resulting model, more intelligent decisions can be made about the type, length, and placement of cable to be used as well as the placement of cable simulators and equalizers at various points in the system, such as at TAPs, amplifiers, fiber nodes. In addition, the parameters of interest that are being degraded in the signal path can then be understood.

While cable loss is a factor to be considered in system design, the loss introduced by the cable varies with frequency. When building or re-designing an existing cable network, an engineer can test various thicknesses and lengths of cables that can be used in cable systems, and the measured results can be plotted against frequency. This gives the system designer an easy way to determine the actual loss introduced by the cable in the overall system. FIG. 6 illustrates varying degrees of cable loss for example types of cable. As can be seen in column 1, common cable types are associated with specific characteristics, here loss per foot. The longer the cable, the more cable loss is anticipated. The chart in FIG. 6 shows loss per foot for each example cable size at four different frequencies, 900 MHZ, 2000 MHZ, 2500 MHZ, and 5000 MHZ.

If not modeled as part of the system, breakdown of signal attributed to cables can lead to unexpected system performance degradation and also lead to costly time delays in debugging and corrections. Even with this understood, cables are notoriously difficult to model correctly. Using a simple transmission line model may not effectively model this element because it is difficult to model a cable both in the frequency and the time domains. Thus, cable simulators are often used to help developers design more accurate systems where physical modeling is inaccurate or impracticable.

Cable simulator functionality is typically achieved via passive, plug-in elements with each supporting a specific, non-tunable cable loss value. In general, a cable simulator is a passive circuit that simulates the attenuation profile of a given cable response, so that the high frequencies are attenuated more than the lower frequencies. In general, an equalizer increases the tilt to offset for the attenuation of the higher frequency signals (e.g., high frequencies are attenuated less than the lower frequencies). The cable simulator and/or the equalizer may provide either a linear signal conditioning shape (e.g., substantially linear response), or may provide a non-linear signal conditioning shape that mirrors the frequency dependent loss profile of a coaxial cable.

For the cable network, different losses occur at different frequencies and at different points in the cable network system. It is desirable to include cable simulators and equalizers at various points in the system, such as at TAPs, amplifiers, fiber nodes, and stand-alone locations cut into services in the cable network, so that the customer receives a generally flat signal over the desired frequency range. The cable simulators and equalizers are typically included within a housing or with other circuitry where the cable simulators and equalizers can be plugged in as desired, and swapped out with different cable simulators and equalizers, as desired. For example, a module may include a face plate that is removed, an equalizer or cable simulator is plugged into the circuitry included therein, and the face plate is replaced. These devices are swappable, but are often pre-programmed at specific tuning factor, meaning a different device for each tuning factor.

Tunable or electronically controlled step attenuators (pads) and cable equalizers are currently utilized to accomplish the tuning. As a result, an RF amplifier require a cable simulator plug-in and must dedicate a plug-in location to support this functionality, which cannot be locally or remotely controlled. This forces the use of additional PCB area to support the plug-in and requires a service technician to be locally present at the amplifier location to plug-in the non-tunable cable simulator.

Disclosed herein is a design for a tunable cable simulator with a minimum number of components and minimal insertion loss.

Figure 7:
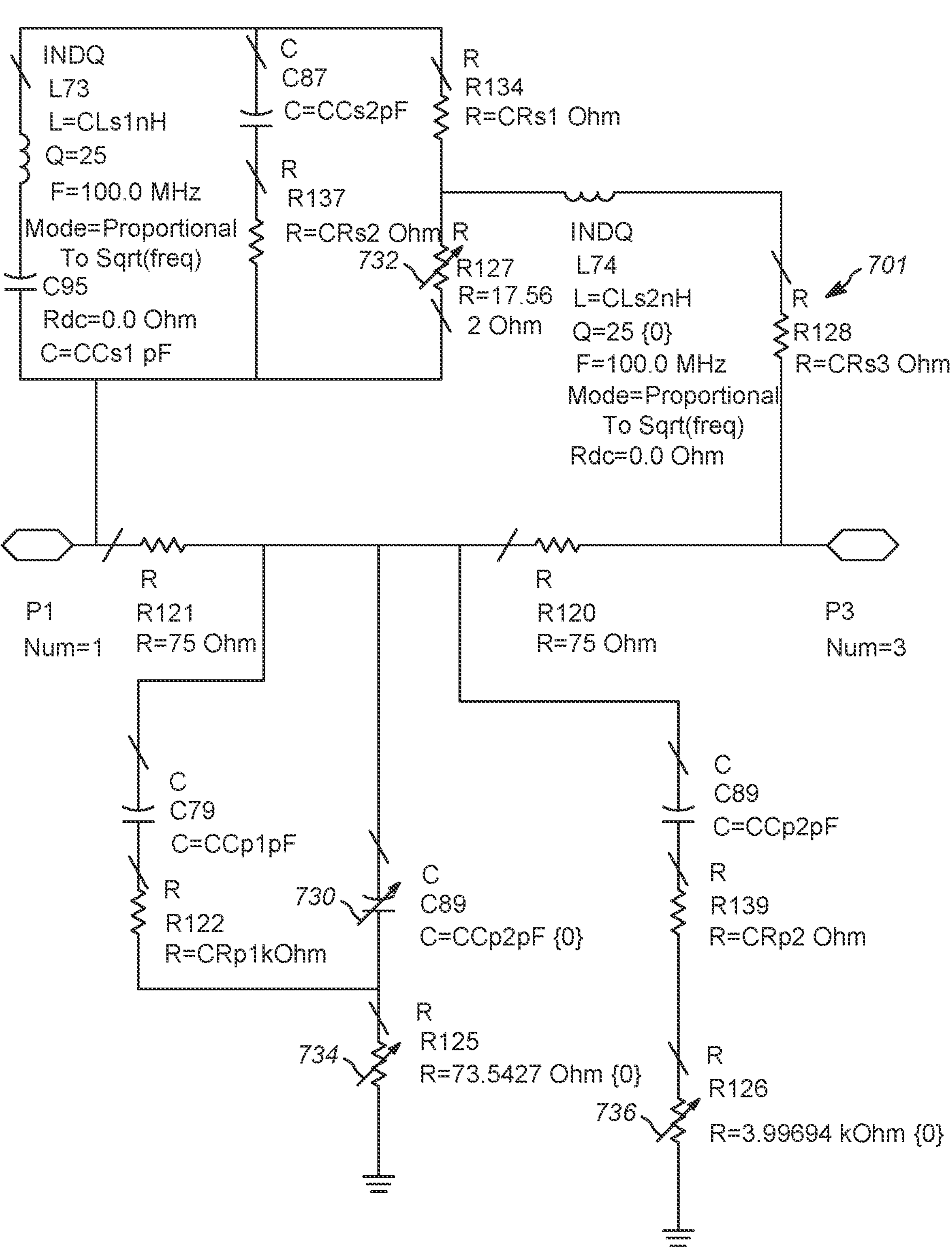
FIG. 7 illustrates an example un-simplified, full duplex cable (FDX) simulator schematic.

FIG. 7 depicts an example un-simplified, full duplex cable (FDX) simulator. Circuit 701 comprises three (3) variable resistors 732, 734, 736 and a variable capacitor 730. All of the components in the circuit are relevant to the simulator's functioning; however, the only the four (4) programmable elements are capable of receiving variable values and can be remotely programmable.

The simulator uses a bridge circuit which is an electrical circuit wherein the two branches of the circuit are linked to a third branch which is connected in between the first two branches at some middle point along with them Still referring to FIG. 7, a conventional bridged T circuit 701 is used, having one variable resistor which is placed in the top branch and two variable resistors, and one variable capacitor placed in the bottom branch. By tuning these four component values, a user can simulate 0 to about 18.5 dB coaxial cable response. In an embodiment, when implementing the design, pin diodes or digital potentiometers can be used as variable resistors, and a varactor or programmable capacitor can be used as a variable capacitor.

As previously described, the normal method for measuring line loss is done manually at each measure interval. Referring briefly to the depiction of cable loss in signal flow shown in FIG. 5, at the TAPs, the values measured are done manually by a series of physical hardware exchanged or even with electronic or tunable attenuators or equalizers. Yet even the latter still requires additional PCB area to support the plug-in, and they also require a service technician or the like to be locally present at the amplifier location to plug-in the non-tunable cable simulator.

Figure 8A:
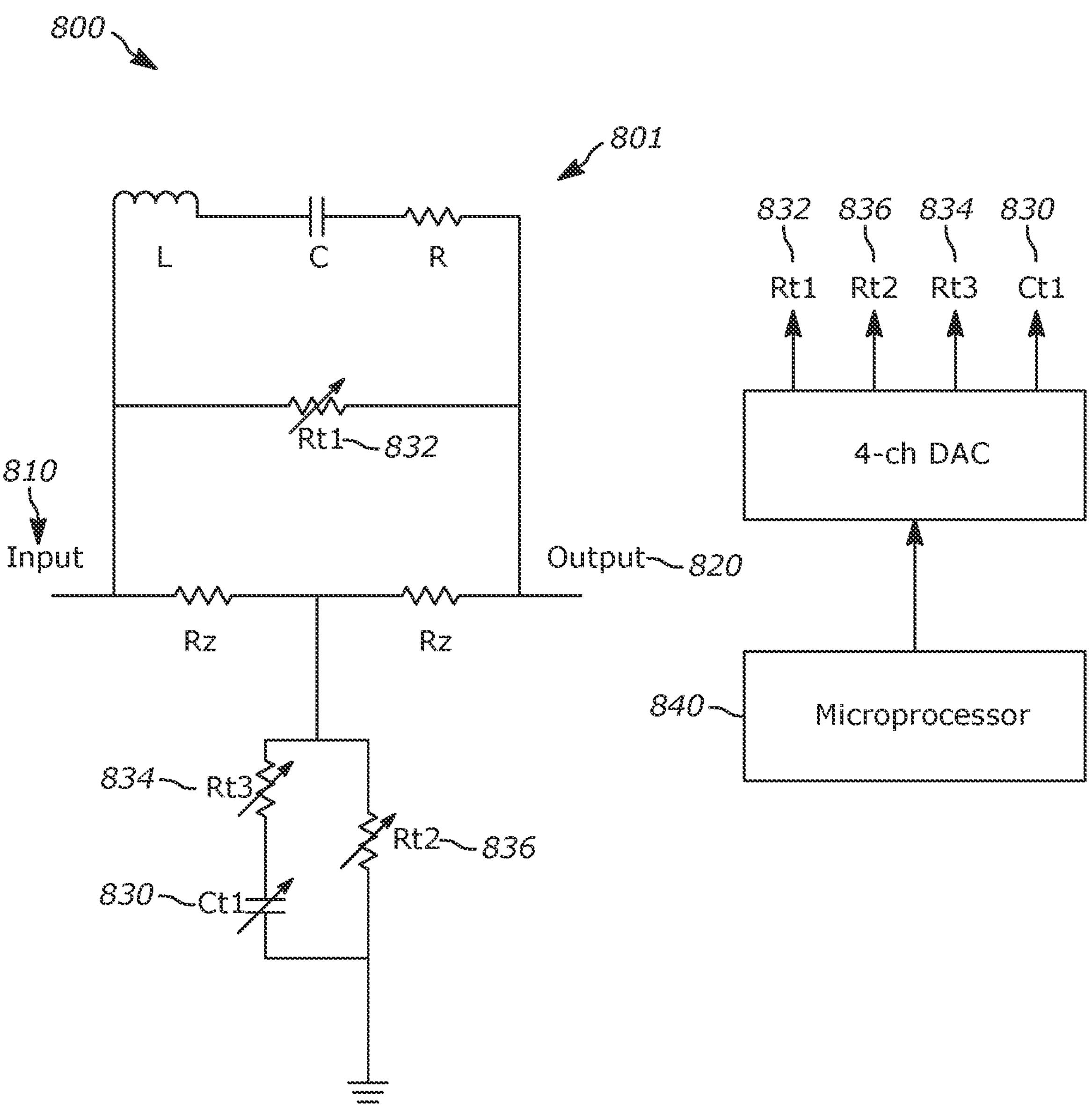
FIG. 8A illustrates an example simplified version of the full duplex cable (FDX) simulator schematic shown in FIG. 7.

FIG. 8A and FIG. 8B illustrate an example simplified, full-duplex cable (FDX) simulator schematic 800. FIG. 8A comprises an example conventional bridge T circuit 801 and an excerpted microprocessor 840. FIG. 8B is an example associated lookup table 850 stored on a microprocessor 840 which is part of the circuit 801 depicted in FIG. 8A. The table 850 stores values used to populate variables components in the circuit components in order to achieve a desired amount of attenuation or equalization. By way of example, the components in the schematic shown in FIGS. 8A and 8B work together to achieve the proper simulation.

In an example conventional bridged T circuit 801, the circuit comprises four (4) variables, three (3) variable resistors in one (1) variable capacitor. The simulator comprises a circuit above and a circuit below an input 810 and an output 820. One variable resistor is placed in the top branch and two variable resistors, and one variable capacitor are placed in the bottom branch. By tuning those four component values, a user can simulate 0 to about 18.5 dB coaxial cable response. In an embodiment, when implementing the design, pin diodes or digital potentiometers can be used as variable resistors, and a varactor or programmable capacitor can be used as a variable capacitor.

The microprocessor 840 is shown apart from the rest of circuit 801, is a digital device on a chip that can fetch instructions from memory, decode and execute them and give results. The microprocessor 840 can store the table 850. As depicted in FIG. 8A, the simulator is a bridged T circuit where in there is a type of output or layer and a behind the scenes or settings layer. The output layer is operating as simulated cable, and the settings layer, including the microprocessor 840 operates as part of the behind-the-scenes layer, or input layer. This layer receives the user interaction and determines and retrieves the values from table 850 to provide the output layer with correct parameters. The settings layer, or input layer, houses the microprocessor 840 and provides for the user to interact with it.

When the communication signal is transmitted within a certain distance in the coaxial cable, for example, after 50 meters, the signal is obviously attenuated, and when the power becomes low and cannot meet the requirements, a signal amplifying device is needed. The simulator 800 can be built into the amplifier for implementation in the field. An additional advantage of simulator 800 is minimal circuitry comparatively to current simulation systems. When an RF amplifier is first built and setup in the field, it is pre-set with a certain of cable loss. If the cable loss is exactly same as this pre-set value between two RF amplifiers, then the input level into the second amplifier is flat across whole frequency range, there will be no need for any Cable EQ or Cable Simulator. However, if the cable length is shorter than the pre-set length, then a Cable Simulator would be needed. After the right amount of cable simulator, the input level into the second amplifier is flat across whole frequency range. On the other hand, if the cable length is longer than the pre-set length, a Cable EQ will be needed. After the right amount of Cable EQ, the input level into the second amplifier is flat across whole frequency range. Same happens for the third, fourth, fifth or sixth amplifiers.

Referring now to FIG. 8B, an example lookup table 850 can be used by the simulator 800 to determine the values to program the variable values for the given circuit at a desired dB level. In this example, and referring to the table 850, the vertical axis comprises rows for three programmable resistors and one programmable capacitor. The horizontal axis comprises columns for example dB simulator values. Here there are example dB values of 0, 2, 7, 10.5, 16 and 18.5. The column-row intersection provides a value to be input to the simulator for a given variable. In one example, a decibel value of 7 dB is desired. Therefore, in the system, the corresponding values for 7 dB can be found via the lookup table 850, and once accessed, these values can be references for the corresponding cells for 7 dB at 860*a*-*d*. These corresponding cells provide the inputs for the four variables in the circuit and cable simulator 800.

Continuing with the same example and still referring now to the table 850 for the values for 7 dB to set capacitor c80 830, the table value is 4 pF and thus, the capacitor component will be tuned to 4 pF 860*c*. Resistor 832 is referenced in the table 850 and yields a value 227 ohms 860*a* to which R126 would be set. The table provides a value 10 ohms at 860*d* to which R125 will be set. And finally, value 860*b* provides a value of 142 ohms to which R127 would be programmed. Further, example part numbers are shown in column 865 corresponding to, for example, specific variable resistors for which these values are accurate. Example manufacturer part numbers are set forth as information to build the circuit so that the designing engineer has the correct specification for use. Column 867 further describes a current range for the resistor. The range is used to give the user some information to ensure that the needs of the cable network does not vary much from the specified range.

Figure 9A:
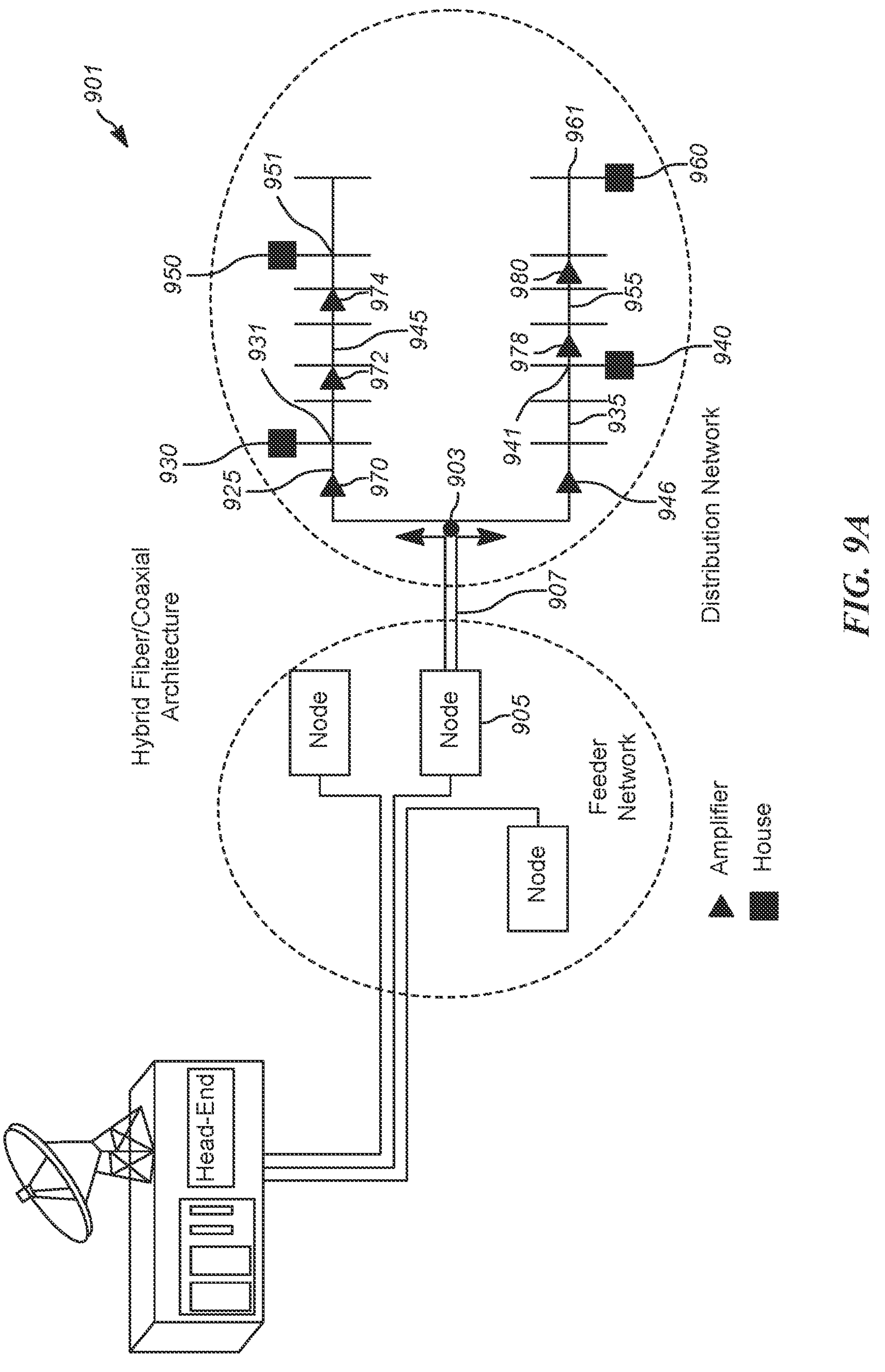
FIG. 9A is an example schematic illustrating a network and its utilization of the simulator in the network.
Figure 9B:
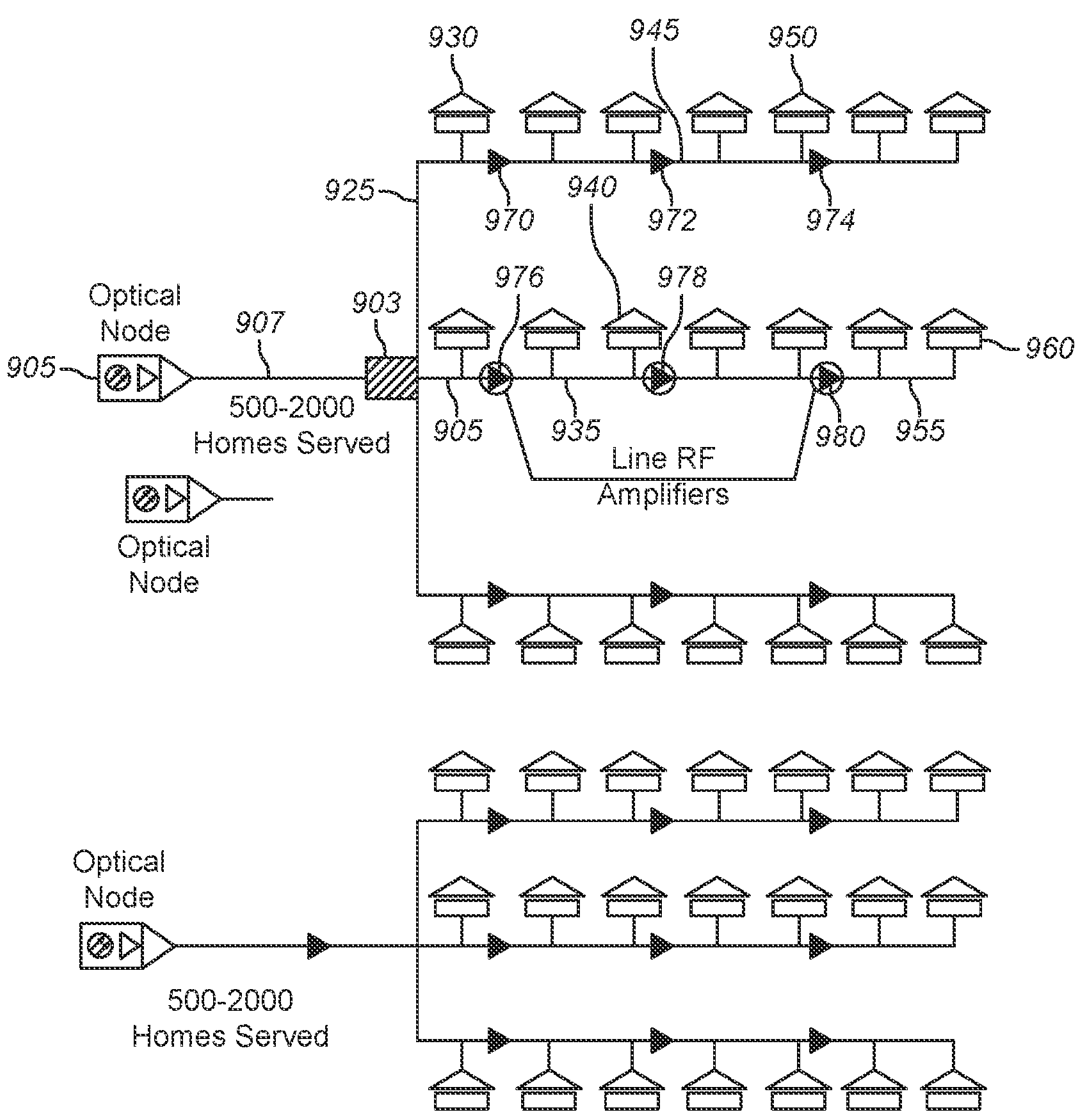
FIG. 9B is another example schematic illustrating a network and its utilization of the simulator in the network.

Referring now to FIG. 9A and FIG. 9B, example schematics illustrating a network and its utilization of the simulator 800 in the network are shown. Here, the example network comprises an HFC network 901 including an optical node and conversion drop point 905. The example network also comprises a tap 903 and cable line destinations, for example, homes 930, 940, 950, and 960. Each destination home has an associated end of line (EOL) point, 931, 941, 951, and 961 respectively, and incoming cable 925, 935, 945, 955, respectively. FIG. 9B also shows amplifiers 970, 972, 974, 976, 978, and 980, marked and numbered in part in FIG. 9A.

In an example Hybrid Fiber-Coax (HFC) Network 901, an optical node 905 performs an optical to electrical conversion, providing an RF output that is distributed via coaxial cable 907 for distribution to subscriber locations, for example 930, 940, 950, and 960. The distribution network connected to the node output typically consists of RF tap 903 and passive elements which direct a portion of the signal to the subscriber location, while also directing a portion of the RF signal further into the distribution network. RF amplifiers are utilized in the distribution network to provide amplification in order to overcome the loss introduced by the transmission medium (coaxial cable) and the tap and passive elements connected to the coaxial cable.

There can be typically three to six RF amplifiers following an optical node in the distribution network, along with a plurality of RF taps and passives. The RF amplifiers are designed to produce a linear output tilt, with RF output level increasing as the amplified frequency increases.

This tilt varies, but typically, the RF amplifier output profile is internally pre-equalized, to a certain amount of coaxial cable loss and slope characteristics so that it has 15-20 dB uptilt from the lowest frequency to highest frequency. Due to the varying loss characteristics of the distribution network, RF amplifiers typically feature signal conditioning locations, which are used to condition the tilt and RF level at the input of the amplifier in order to achieve the desired linear output level and tilt over frequency. This signal conditioning typically features two methods, the first being a flat attenuation of the signal level versus frequency (pad), the second method involves varying the attenuation based on frequency. This varied attenuation versus frequency is intended to match the characteristics of coaxial cable loss (cable simulator) or the inverse frequency response characteristics of coaxial cable (cable equalizer). For example, If the distribution span loss prior to the amplifier has the same, inverted slope characteristics as the internal equalization in the RF amplifier, a cable simulator or cable equalizer will not be required. However, if the cable length is shorter than the preset cable length, a Cable Simulator will be needed; On the other hand, if the cable length is longer than the preset cable length, a Cable Equalizer will be needed. Pad functionality (flat signal attenuation versus frequency) and cable equalizer functionality can be provided via passive or active elements, where passive elements are typically plug-in devices, and active elements are normally permanently located in the design and controlled via external stimulus, such as a microprocessor.

Thus, it follows that the effectiveness of a cable network relies on a consistent signal strength from the source, for example the head end or the optic node, to the end of line, for example, 931, 941, 951 or 961. Typically, to ascertain where to place amplifiers and equalizers and at what settings and locations to place them in order to manage the non-equal loss in signal strength through the cable network that varies with frequency of the signal. As previously mentioned, normally measuring line loss must be done manually at each measure interval. Determining the line loss values, for the development engineer takes a long time and must be done at the point of each sampling, requiring time and special equipment to get the tuning values.

By contrast, an example simulator 801 mimics or calculates line losses where the losses are a function of frequency, and the throughput gradually goes down as frequency increases. Referring back to FIGS. 9A and 9B, if the cable 925, 935, 945, and 955 is 50 dB cable, the strength of the signal can be either too strong or too weak at the destination point, 930, 940, 950, or 960 depending on how close the destination is to being 50 feet from the last signal bump. As previously described TAPs, amplifiers, or other means of adjusting the signal strength are needed in order to produce a suitable signal at the endpoints of varying distances from the source. As also previously described, this has been accomplished the cable simulators and equalizers, but which are typically included within a housing or with other circuitry where the cable simulators and equalizers can be plugged in as desired, and swapped out with different cable simulators and equalizers, as desired. For example, a module may include a face plate that is removed, an equalizer or cable simulator is plugged into the circuitry included therein, and the face plate is replaced. These devices are swappable, but are often pre-programmed at specific tuning factor, meaning a different device for each tuning factor. However, using the simulator disclosed herein, the chip depicted in FIGS. 7 and 8 allows for remote tuning.

Referring again to FIGS. 9A and 9B, when the communication signal is transmitted within a certain distance in the coaxial cable, for example, after 50 meters, the signal is obviously attenuated, and when the power becomes low and cannot meet the requirements, and the amplifier with simulator 800 is utilized. For example, at the end destination 930, the signal strength is tested and provides a higher signal strength because the cable length of 30 meters and the signal strength is tuned for 50 meters. As the cable used is designed to be implemented in length of 50 feet, the strength at home 930, which is 30 meters from the source will need to be simulated or attenuated to the signal strength associated with the equivalent of 20 meters of cable. As a further example, the destination 960 provides a cable length of 70 meters. As the cable used designed to be implemented in length of 50 meters, the strength at home 960, which is 70 meters from the source, or 20 meters longer than acceptable signal strength can extend, will need to be equalized to the equivalent of 20 meters of cable.

In another example, signal strength is tested at any of the amplifiers 970, 972, 074, 976, 978, and 980. In terms of circuit 801, the circuit implements a determination of loss drop off (or the opposite) as a function of frequency. By way of this example, it is shown that circuit 801 comprises four (4) variables: the variable components are made up of three (3) variable resistors and one (1) variable capacitor. For example, at the end destination the signal strength is tested. The simulator achieves a gradual roll off by mimicking the cable loss. At each cable loss determination, the operator can remotely control the resistance by using values looked up in the table 850 for three (3) resistor values and one (1) capacitor value. At each cable loss, these sets of values are stored, for example, values for a 1 db loss whereby the table can provide exact values.

Figure 10:
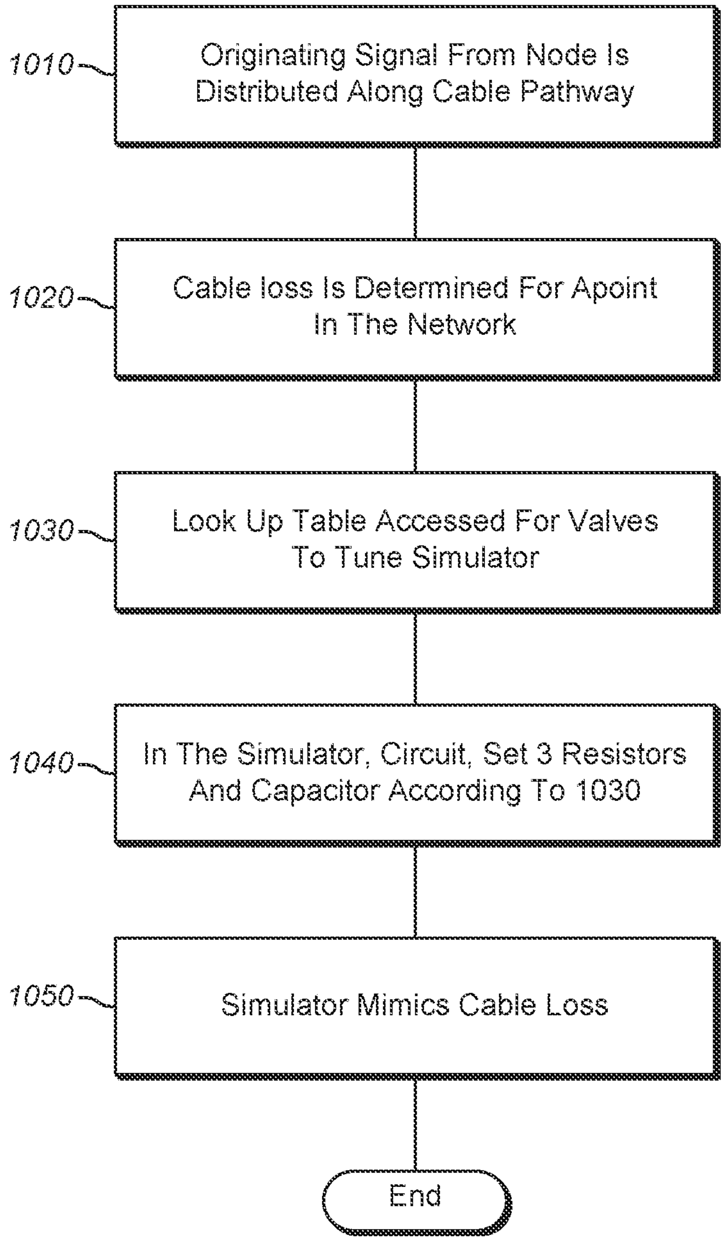
FIG. 10 depicts an example method for a remote tunable cable simulator.
Figure 11A:
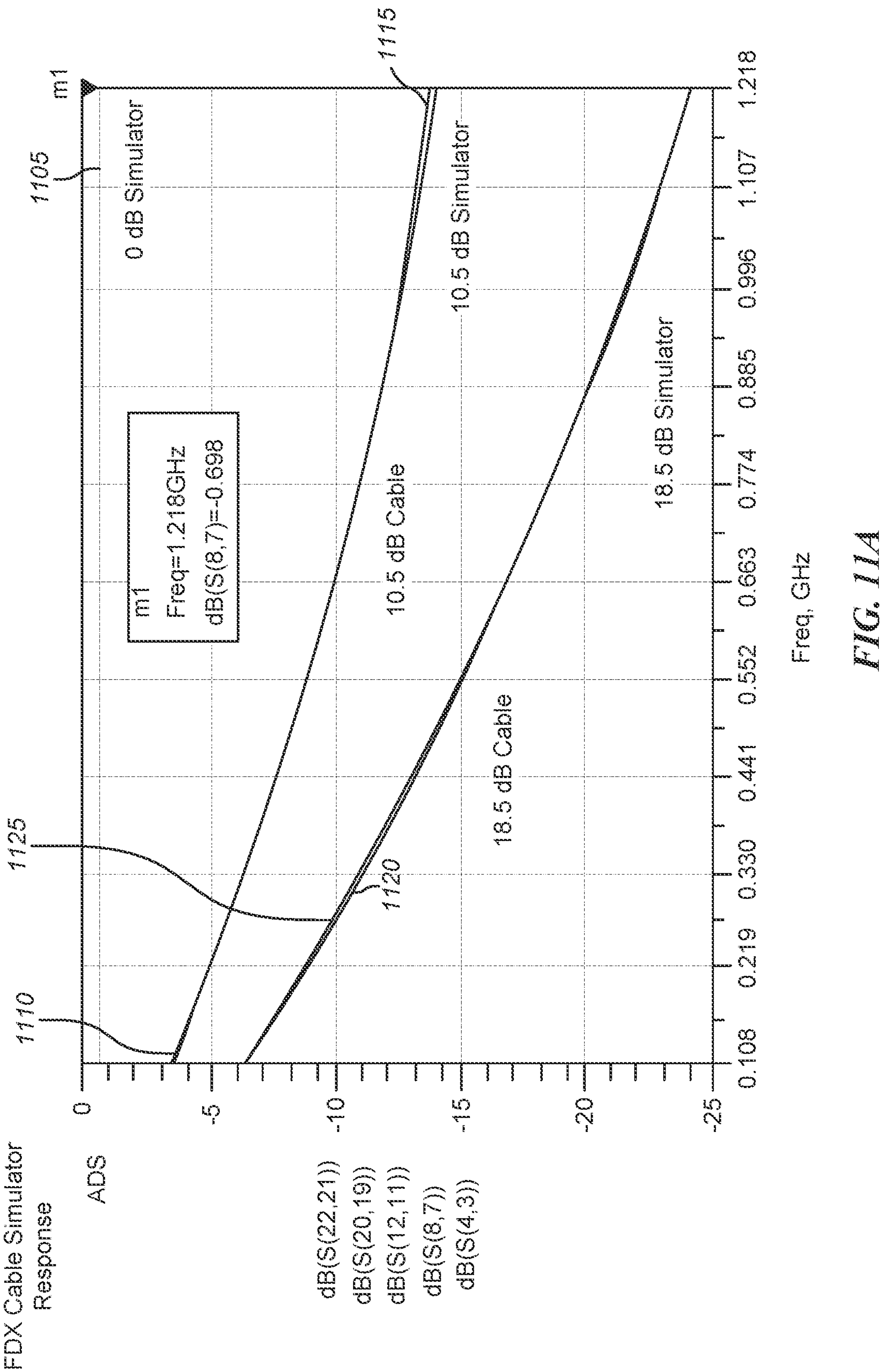
FIG. 11A illustrates a full duplex Cable Simulator Response.
Figure 11B:
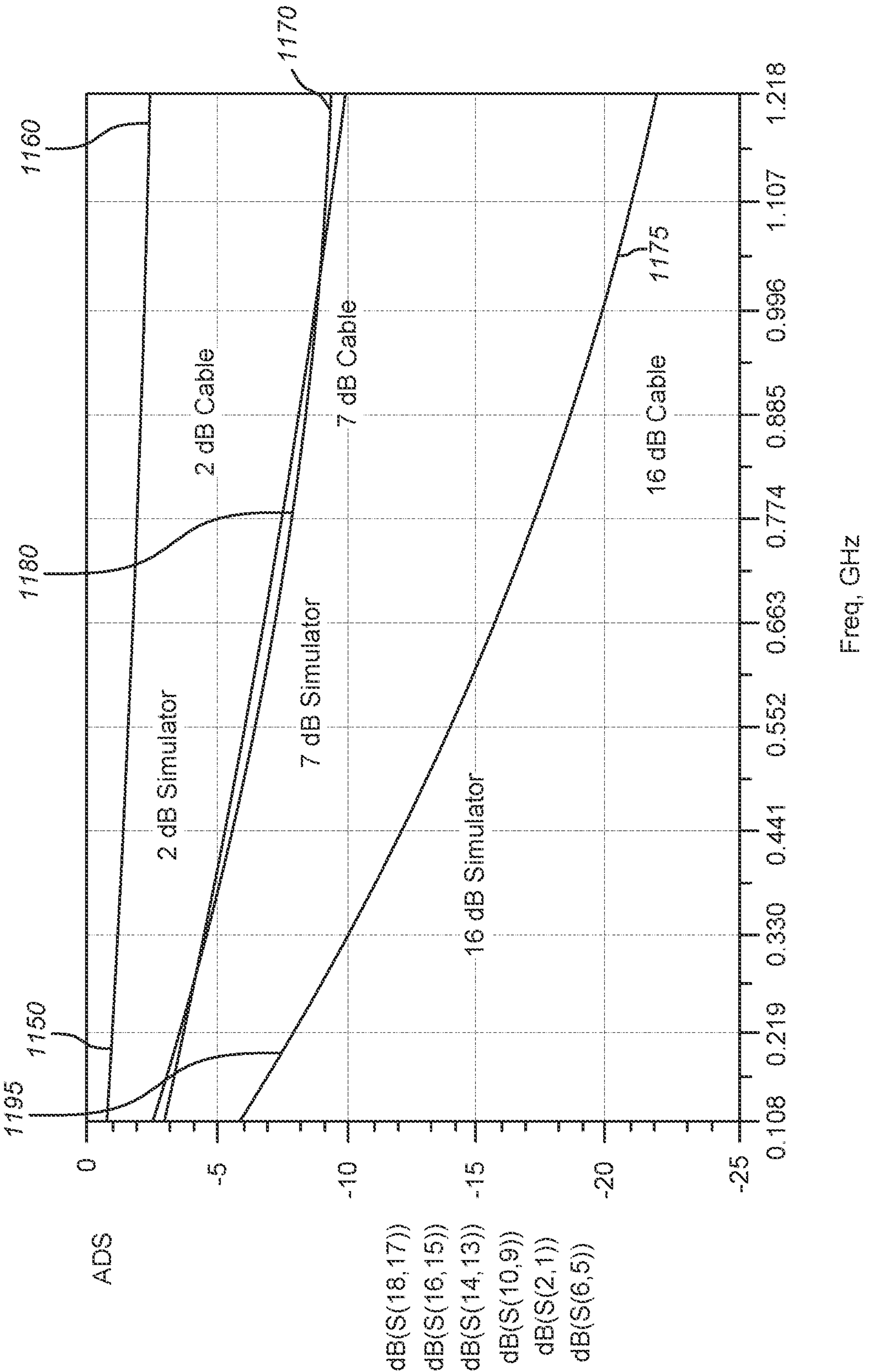
FIG. 11B illustrates a second FDX Cable Simulator Response.
Figure 12:
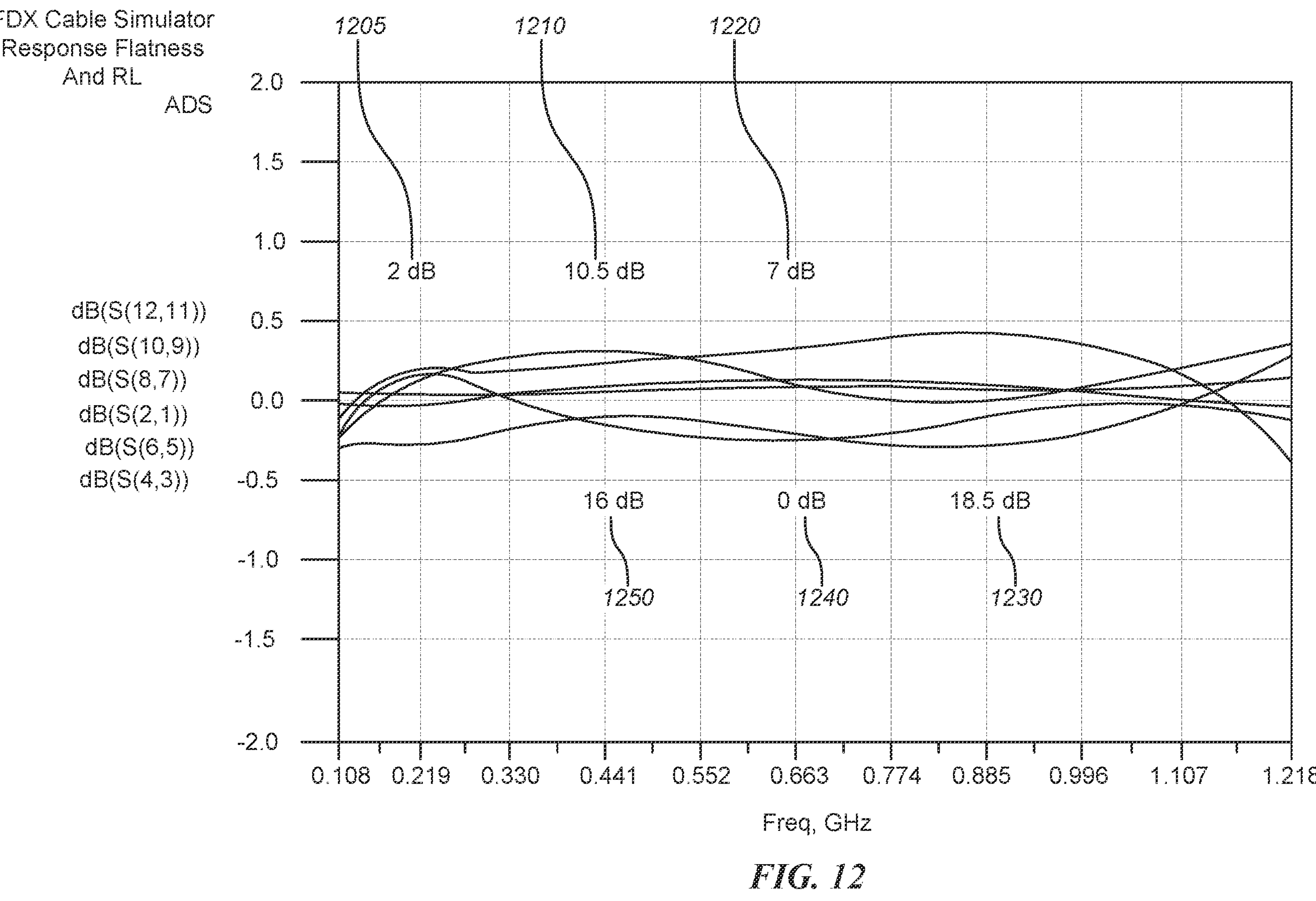
FIG. 12 shows an FDX Cable Simulator Response showing flatness.

FIG. 10 describes a method for remotely tuning an electronic tunable cable simulator 800, the method being unique in that it can be both programmed and implemented remotely. Current technology requires that any values programmed in circuitry have to be manually tuned by hand and on location in order to create the simulated cable. For changes in value, the hardware must be exchanged for different hardware with the new desired tuning value. For example, if the line value tested is at a value needing correction, the simulator can be remotely tuned to provide the desired dB loss cable, via the lookup table stored on the simulator and to auto-tune the circuit to those values provided by the table. FIG. 11 and FIG. 12 demonstrate the accuracy of the method of using the tunable simulator.

Because a typical cable system is spread over a wide area, there are unique problems in sustaining signal to its various components. The actives (nodes, amplifiers, etc.) in a cable network are often spaced at considerable distance from each other and may cover a significant geographic area. Thus, undesired cable strength or degradation occurs depending on how close or far the user is from the active.

At 1010, the originating signal from a node is distributed along a cable pathway in network.

At 1020, a cable loss is determined for a point in the cable network. For this example, the reading is 1 dB loss.

At 1030, once a certain amount of cable simulator is needed, the microprocessor will look to the stored table and retrieve the three resistor values and one capacitor value required to tune the simulator. In this example, the microprocessor 840 uses the lookup table 850 to get the values to tune the variable resistors and capacitor to 1 dB cable.

At 1040, set three resistors and one capacitor correspondingly. The cable simulator 800 can be tuned from 0 dB to 18 dB and at each step, four resistor and capacitor values are stored inside a microprocessor and retrieved at step 1030.

At 1050, the simulator mimics the cable loss, and at step 1050, the simulator 800 restores the value. The resistor or capacitor is then tuned properly and achieves exactly ID B loss at one end.

This signal conditioning typically features two methods, the first being a flat attenuation of the signal level versus frequency (pad), the second method involves varying the attenuation based on frequency. This varied attenuation versus frequency is intended to match the characteristics of coaxial cable loss (cable simulator) or the inverse frequency response characteristics of coaxial cable (cable equalizer). For example, if the distribution span loss prior to the amplifier has the same, inverted slope characteristics as the internal equalization in the RF amplifier, a cable simulator or cable equalizer will not be required. However, if the cable length is shorter than the preset cable length, a Cable Simulator will be needed; On the other hand, if the cable length is longer than the preset cable length, a Cable Equalizer will be needed. Pad functionality (flat signal attenuation versus frequency) and cable equalizer functionality can be provided via passive or active elements, where passive elements are typically plug-in devices, and active elements are normally permanently located in the design and controlled via external stimulus, such as a microprocessor.

To better understand the implications of extending the cable simulators and equalizers in their frequency range, a set of graphs are illustrative. Referring to FIG. 11A and FIG. 11B, the cable loss is illustrated for a series of different cable simulators.

FIG. 11A and FIG. 11B show a full duplex cable (FDX) Cable Simulator Response. The simulator 800 can simulate line losses where the losses are a function of frequency, and the throughput gradually goes down as frequency increases. The example embodiments describe a circuit that implements the drop off in frequency. FIGS. 11A and 11B illustrate that frequency increases signal or cable degrades as a function of frequency. The two lines show degradation of signal on actual cable vs degradation of signal simulated, on the same frequency response. The graphs illustrate that the simulator can be tuned to match the desired dB cable being tested with minimal line loss.

FIG. 11A shows at line 1105 that the simulator attempts to achieve flatness at 0 dB via the simulator. As there is no 0 dB in reality, the simulated line is measure of achieving flatness. The graph also shows 10 dB cable 1110 and the simulated cable 1115. At 1120, 18.5 dB cable is shown against the simulated 1125 cable.

FIG. 11B shows another graph illustrating the actual cable vs simulated cable. At 2 dB cable, the cable 1160 is shown alongside the 2 dB simulated at 1150. Line 1170 shows 7 dB cable alongside 7 dB simulated cable 1180. Next 16 dB cable 1190 is shown alongside 16 dB simulated 1195.

The S parameters describe the signal in a complicated network. The simulator is set up to match, the numbers showing the setting within the simulator. Each actual cable has a real circuit associated with it. In FIGS. 11A and B, the Cable simulator response is compared with an actual Cable Loss at different lengths (or different losses). As shown, the cable simulator accurately aligns with actual cable loss.

FIG. 12 illustrates FDX cable simulator response flatness and return loss. FIG. 12 shows lines on the graph 1200, 2 dB cable 1205, 10.5 cable 1210 7 dB cable 1220, 16 dB cable 1250, 0 dB cable 1240, 18.5 dB cable 1230. The simulator attempts again to achieve a theoretical perfect flat line at line 1240 for 0 dB. Line 1240 maintains a slow downward slope. FIG. 12 shows overall frequency response of the Cable simulator when normalized with an actual cable loss. As shown, the frequency response is very flat for the cable simulator.

When a cable system is designed, the cable length can vary for a variety of reasons. The longer the cable, the higher the signal loss. RF transmission loss varies with frequency. In RF, this behavior is the frequency response, and the associated transmission loss can be compensated for with flatness correction to ensure flat output power continues even after the signal has passed through all the cables, switches, and splitters.

FIG. 12 shows via a graphical representation that the simulator 800 produced a result indicating that the Response Flatness is within 0.6 dB peak to peak over a tuning range of 0-16 dB. The response flatness is within 0.8 dB peak to peak at 18.5 dB. Both of these are favorable, showing minimal line loss.

Figure 13:
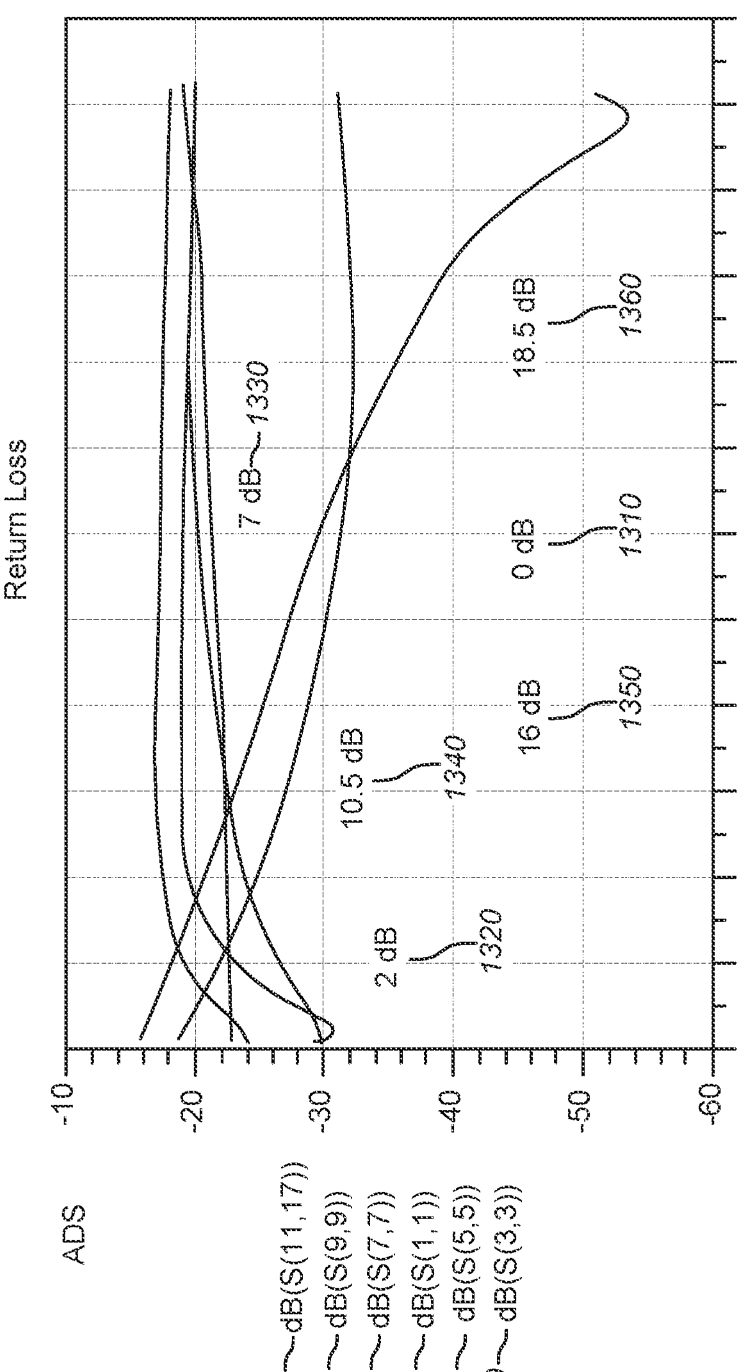
FIG. 13 shows an FDX Cable Simulator Response showing return loss.

FIG. 13 shows Return Loss (RL) over frequency. The graph shows lines at 0 dB 1310, 2 dB 1320, 7 dB 1320, 10.5 dB 1340, 16 dB 1350, 18.5 dB 1360. The S-Parameters in FIG. 13 are indicative of return loss, defined as incident power divided by transmitted power. Again, the S-parameters 1370, 1362, 1374, 1376, 1378, and 1380 describe aspects of the signal in a complicated network.

Return loss is the measurement of the number of signals that is reflected back toward the source. Its unit of expression is also in decibels (dBs). This parameter is always a positive number, and a high return loss is a favorable measurement parameter, and it typically correlates to a low insertion loss. In the case of simulator 800, the return loss is the loss of signal power due to signal reflection or return by a discontinuity in a link or transmission line. This impedance mismatch can be with a device inserted in the line or with the terminating load. FIG. 13 illustrates that the cable has better than 16 dB return loss for the whole 0-18.5 dB tuning range.

FIG. 13 shows, at each dB designation, the RL for each pair of actual cable measurement and the simulated counterpart. The measurement is indicative of the power that travels down a transmission line and reaches the component where a portion of the signal is reflected back down the transmission line towards the source from which it came. This portion of the signal does not enter the component.

The RL is expressed in dBs is the ratio of incident power to reflected power. Therefore, we can see how the loss measurement parameters help to accurately gauge the overall efficiency of a measurable signal and component within a system or in a through path. Using the simulator 800 to determine if there are impedance mismatches at the pins of the receiver and transmitter as well as the vias, connectors, and various other discontinuities, enables an engineer to accurately assess efficiency and performance and in term use that essential assessment tool in understanding signal performance and adjust as needed. In this graph, the simulated data against the actual data is showing us that the return loss for the tuning range of 0-18.5 dB is >16 dB.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation to data processing apparatus. The tangible program carrier can be a propagated signal or a computer readable medium. The propagated signal is an artificially generated signal e.g., a machine generated electrical optical or electromagnetic signal that is generated to encode information for transmission to suitable receiver apparatus for execution by a computer. The computer readable medium can be a machine-readable storage device, a machine-readable storage substrate, a memory device, a composition of matter effecting a machine-readable propagated signal or a combination of one or more of them.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The processes and logic flows described in this specification may be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A programmable cable simulator for a cable network comprising:

a circuit receiving an input signal from an input coaxial cable, the input signal having a first signal frequency;

the cable simulator receiving a cable loss value representative of a loss of signal over a portion of said cable network;

the cable simulator retrieving one or more stored values from a stored table, in response to the cable loss value;

the cable simulator programming one or more variable and programmable components in the circuit, including at least one variable resistor and at least one variable capacitor based on said one or more stored values;

the circuit modifying the first signal frequency of the input signal according to the retrieved one or more stored values programmed to the one or more variable components; and the circuit providing an output signal to an output coaxial cable for an end user.

2. The circuit of claim 1, wherein the components include a first variable resistor, a second variable resistor, a third variable resistor.

3. The circuit of claim 2, wherein the input signal is modified by tuning the input signal according to respective values stored in the variable resistors and a value stored in the programmable variable capacitor.

4. The circuit of claim 1, wherein the at least one variable and programmable component can be programmed remotely.

5. The circuit of claim 1, wherein the at least one variable and programmable component can be programmed locally with no physical change of components.

6. The circuit of claim 1, wherein the input cable signal incurred a frequency amplitude during the transmission.

7. The circuit of claim 6, wherein the circuit includes equalizer.

8. The circuit of claim 1, wherein the input cable signal incurred a cable frequency loss during the transmission.

9. An apparatus for modifying a coaxial cable signal in a cable network, comprising:

a circuit installed between two coaxial cables, the circuit further comprising:

an input;

an output;

an upper portion comprising an inductor, a capacitor, and a first variable resistor;

a lower portion comprising a second variable resistor, a third variable resistor, and one variable capacitor;

a microprocessor; and a table comprising one or more stored values configured for programming the first, second, and third variable resistors and the variable capacitor, wherein the table is stored in the microprocessor;

wherein the first, second, and third variable resistors and the one variable capacitor can be programmed to the values stored in the table on the microprocessor to effect tuning of the cable signal to simulate cable loss of an amount variably selected over a range of values between 0 and 18 dB wherein said microprocessor is configured to receive a cable loss value representative of a loss of signal over a portion of said cable network, and in response to receiving said cable loss value, retrieves from said table one or more of said stored values and programs the first, second, and third variable resistors and the variable capacitor to tune the cable signal.

10. The apparatus of claim 9, wherein the circuit further comprises an RF amplifier.

11. The apparatus of claim 9, wherein the variable resistors comprise pin diodes.

12. The apparatus of claim 9, wherein the variable resistors comprise digital potentiometers.

13. The apparatus of claim 9, wherein the variable capacitor comprises one of a varactor or a programmable capacitor.

14. The apparatus of claim 9, wherein the circuit can be locally programmed without the removal or replacement of components.

15. The apparatus of claim 9, wherein the variable components of the circuit can be remotely programmed.

16. The apparatus of claim 9, wherein the variable components are fixed and reduce insertion loss.

17. The apparatus of claim 9, wherein the apparatus equalizes the cable signal.

18. The apparatus of claim 9, wherein the apparatus simulates the cable signal.

* * * * *